United States Patent [19]
Hayashi et al.

[11] Patent Number: 5,647,989
[45] Date of Patent: Jul. 15, 1997

[54] METHOD FOR RECOVERING ABRASIVE PARTICLES

[75] Inventors: Yoshihiro Hayashi, Tokyo; Kouichi Yabe, Yokohama; Tetsuo Mizuniwa, Yokosuka, all of Japan

[73] Assignees: Kurita Water Industries Ltd.; NEC Corporation, both of Tokyo, Japan

[21] Appl. No.: 542,434

[22] Filed: Oct. 12, 1995

[30] Foreign Application Priority Data

Oct. 14, 1994 [JP] Japan ................................. 6-249851

[51] Int. Cl.$^6$ ................................................ B01D 61/00
[52] U.S. Cl. ............................ 210/641; 210/650; 210/651; 134/10
[58] Field of Search ........................ 210/641, 651, 210/650, 652, 195.2; 134/10–13

[56] References Cited

U.S. PATENT DOCUMENTS

| | | | |
|---|---|---|---|
| 4,787,980 | 11/1988 | Ackermann et al. | 210/638 |
| 4,879,041 | 11/1989 | Kurokawa et al. | 210/640 |
| 5,061,374 | 10/1991 | Lewis | 210/638 |
| 5,401,400 | 3/1995 | Torielli et al. | 210/195.2 |

FOREIGN PATENT DOCUMENTS

| | | | |
|---|---|---|---|
| 189987 | 10/1984 | Japan | 210/651 |
| 1135580 | 5/1988 | Japan | 210/651 |

*Primary Examiner*—Ana Fortuna

[57] ABSTRACT

A method for recovering abrasive particles of, in particular, colloidal silica, in a simple manner from a spent abrasive suspension, which requires subjecting the spent abrasive slurry (5) containing colloidal silica used for polishing a semiconductor substrate in a microfilter (1) to thereby concentrate coarse particulate impurities for being removed out of the system, subjecting the slurry (6) which has permeated through the microfilter to an ultrafiltration in an ultrafilter (2) to concentrate the retained abrasive particles and recovering this concentrate in order to recover the colloidal silica.

6 Claims, 2 Drawing Sheets

METHOD FOR RECOVERING ABRASIVE PARTICLES

FIELD OF THE INVENTION

The present invention relates to a method for recovering abrasive particles from a spent abrasive suspension used for polishing a semiconductor substrate or a surface layer formed thereon.

BACKGROUND OF THE INVENTION

It is a common practice to planarize not only the intrinsic surface of a semiconductor but also the surface of a processed layer formed thereon. For building up, for example, a semiconductor IC having multiple circuit layers in which wiring layers are arranged three-dimensionally, it is necessary to planarize the surface of the interlayer insulator film (silicon oxide film). Namely, when an aluminum wiring circuit is formed as the first layer (the bottom layer) and a silicon oxide film is applied thereto by, for example, CVD, a surface irregularity is brought about on the silicon oxide film due to the presence of the underlying aluminum wiring. If a photolithography or a dry-etching is carried out on this irregular surface oxide film for forming a second layer of a aluminum circuit, failures, such as defocussing in the exposed resist patterning and wiring discontinuity due to dry-etching at the staged portion of the irregular surface, may occur.

Accordingly, a practice of polishing such surfaces with an abrasive is incorporated. This practice comprises polishing the surface on a semiconductor substrate using a polishing element, such as a polishing pad, to planarize the surface while supplying an abrasive in a form of a slurry in between the substrate surface and the polishing pad with dilution by water supplied thereto.

As the abrasive, colloidal silica has found its application thereto due to its high dispersibility, uniform particle size around the average size and other conveniences, wherein it is used in a form of colloidal silica suspension by dispersing it in a dispersion medium, such as water.

When polishing is effected using such an abrasive, the polished material on the surface of the semiconductor substrate is scraped off and, at the same time, the particles of the colloidal silica may also suffer a crushing to form a polishing refuse. This polishing refuse itself reduces the polishing ability of the abrasive. Occasionally, there may occur a formation of gelled product in the suspension during the polishing operation due to a partial drying of the abrasive suspension. In general, a spent abrasive suspension is discarded as such, since a large-sized polishing refuse and aggregation may cause damage on the polished surface and since the polishing ability is decreased by accumulation of polishing refuse.

In Japanese Patent Application Kokai Hei-2-25762, there is proposed a method for separating large-sized particles from a spent polishing liquor by centrifugation and to reuse the remaining liquor after adjusting the colloidal silica concentration by adding thereto water or additional colloidal silica, in order to overcome the situation that the existing technique for reclaiming the spent abrasive suspension using a conventional filter did not attain a sufficient removal of the particles that cause damage to the polished surface.

However, this method requires a centrifugal force of 8,000 G or higher due to the small mass difference between the particles to be removed and the colloidal silica particles, necessitating a large and complicated apparatus and resulting in a difficulty in the operation and maintenance of the apparatus. This method also exhibited a problem in that some reduction in the polishing performance is unavoidable due to the accumulation of materials which reduce the polishing ability, such as micronous polishing refuse, since the method provides only for the removal of particles of greater masses. This applies not only to colloidal silica but also to other abrasives.

SUMMARY OF THE INVENTION

The object of the present invention is to propose a method for removing particles that cause a flaw on a surface to be polished from a spent abrasive suspension using a simple apparatus having an easy operation while permitting removal of polishing ability reducing materials to thereby allow the recovery of the abrasive particles in a reusable state.

Thus, the present invention relates to a method for recovering abrasive particles from a spent abrasive suspension used for polishing a semiconductor substrate or a surface layer formed thereon, comprising subjecting the spent abrasive suspension first to a microfiltration using a microfiltration membrane to hold coarser impurity particles back on the retaining side of the membrane to concentrate them for being removed out of the system and subjecting the filtrate from the microfiltration to an ultrafiltration using an ultrafiltration membrane for permitting finer substances to permeate therethrough and be removed out of the system to thereby leave a concentrate of the abrasive particles retained by the ultrafiltration membrane, which are then recovered.

DETAILED DESCRIPTION OF THE INVENTION

Figure 1:
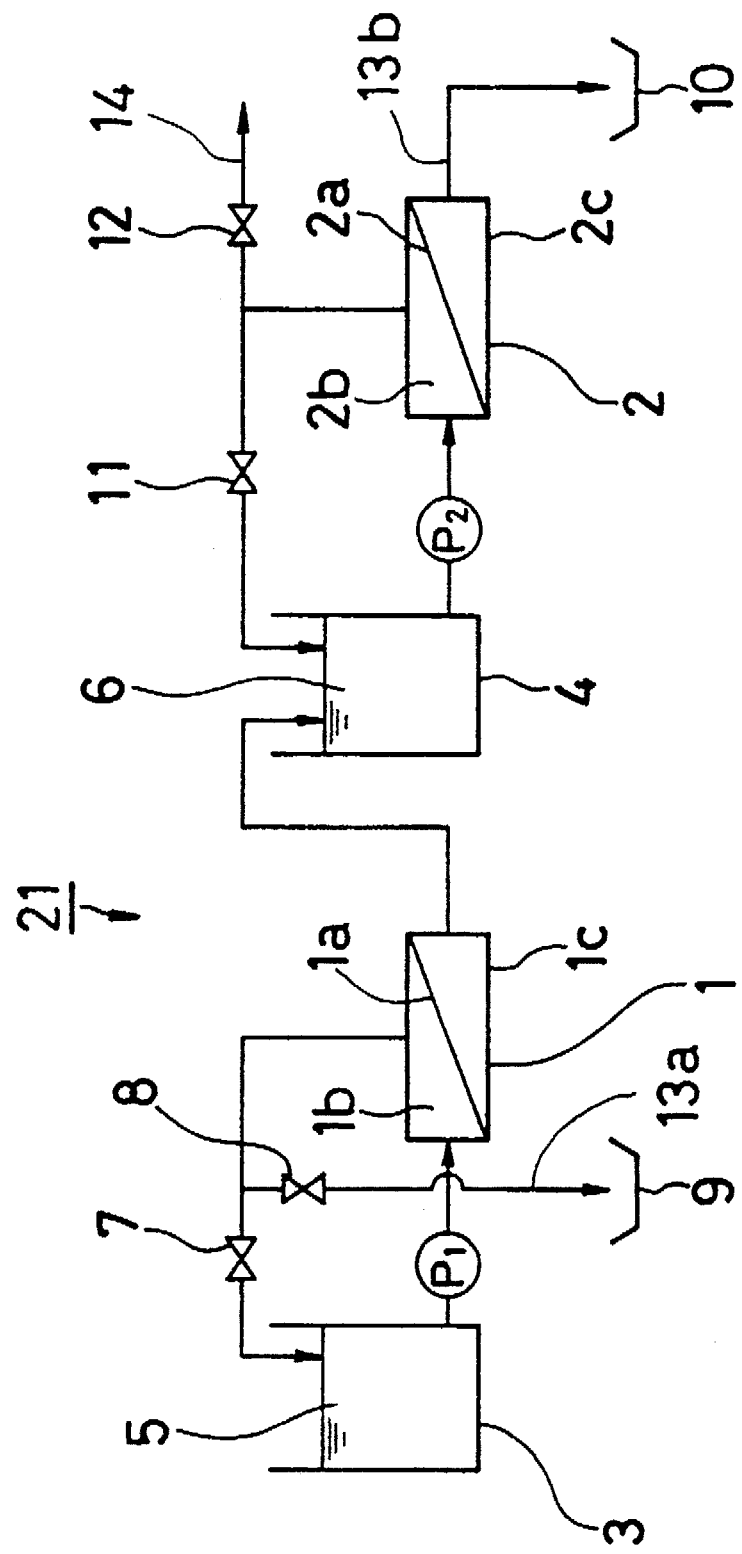
FIG. 1 is a flow diagram of the method for recovering the abrasive particles used in an embodiment of the present invention.

In the context of the present invention, "spent abrasive" means an abrasive containing, for example, colloidal silica, which has been used for polishing a semiconductor substrate or a surface layer formed thereon, inclusive of not only those exhibiting a considerable reduction of the polishing ability but also those which still exhibit a polishing ability. Such abrasives may contain colloidal silica or abrasive components other than colloidal silica.

The semiconductor substrate to be polished includes every substrate requiring polishing, for example, silicon wafers constituting semiconductor elements, such as IC, LSI and the like; interlayer insulator films for multiple wiring circuit layers formed on the substrate; embedded wiring metal films and so on.

For practising the polishing of such surfaces on a semiconductor substrate, there may be employed a method in which the polishing is effected while supplying an abrasive containing colloidal silica in between the substrate surface and the polishing element, such as a polishing pad, under dilution with water supplied thereto, a method in which an abrasive suspension of an abrasive concentration adjusted at a constant level is used under circulation and other pertinent methods.

Examination of the particle size distribution of spent abrasives used for polishing semiconductor products shows that they contain colloidal silica particles of particle sizes of several tens of nm, colloidal silica particles of particle sizes of 100–500 nm and large particle size components with particle sizes exceeding 500 nm composed of polishing refuse, aggregations, gelled products and so on, in addition to a micronous particle component with particle sizes below several tens of nm originated from polishing refuse etc. existing as a causal factor for lowering the polishing ability.

Among them, the coarse impurities with particle sizes exceeding 500 nm are attributive to the occurrence of surface damages, such as flaws and scratches. According to the present invention, the coarse impurities are removed by microfiltration to prevent occurrence of surface flaws upon polishing. However, the polishing ability is yet not recovered by removing the coarse impurities, since the micronous particle component of polishing refuse, etc., is still accumulated therein. Due to the supply of water during polishing, the concentration of the abrasive in the filtrate from the microfiltration is low. Therefore, according to the present invention, the filtrate of the microfiltration is further subjected to an ultrafiltration using an ultrafiltration membrane which permits finer substances to permeate therethrough so as to remove the micronous particle component of polishing refuse, etc., together with the excessive dispersing medium, such as water, to recover an abrasive suspension, such as colloidal silica, which is effective for polishing.

The microfiltration to be incorporated in the method according to the present invention pertains to a technique of so-called membrane separtion and is carried out using a special filtering membrane called a "microfiltration membrane" (MF-membrane) composed of a polymer film of, for example, polycarbonate, cellulose triacetate, polyamide (nylon), polyvinyl chloride or polyvinylidene fluoride, and having a pore size of 100 nm or greater. It is permissible according to the present invention to use microfiltration membranes with pore sizes of 100–1,000 nm, wherein a microfiltration membrane having a pore size of 300–500 nm, preferably 350–450 nm may preferably be used, in order to remove coarse impurities having particle sizes exceeding 500 nm and to hold back colloidal silica particles having particle sizes below about 500 nm.

The microfiltration membrane is supported on a porous support element and the microfiltration of spent abrasive slurry is carried out at a pressure drop across the membrane of 0.1–5 kgf/cm² gauge (0.01–0.5 MPa), in order to remove coarse impurities of polishing refuse, aggregations, gelled products and so on attributive to the occurrence of flaws, etc., upon polishing.

The filtrate, namely, the slurry passed through the microfiltration membrane is then subjected to an ultrafiltration in order to effect removal of finer permeable substances, such as micronous particle components and excessive water, re-establishing the polishing ability and thickening of the retained suspension. The "ultrafiltration" as used in the context of the present invention pertains also to a technique of so-called membrane separation and uses a special ultrafiltration membrane (UF-membrane) made of a polymer film of, for example, collodion membrane, formaldehyde-cured gelatine, cellophane, cellulose, cellulose acetate, polyethylene, polypropylene, a mixture of polypropylene with cellulose acetate, polyacrylonitrile, polysulfone, sulfonated 2,5-dimethylpolyphenyleneoxide, polyion complex, polyvinyl alcohol and polyvinyl chloride, and having a pore size of 2–100 nm, to be used for separating particles composed of masses of atoms of molecular weights in the range of $10^3$ to $10^9$, such as molecular colloids, micellar colloids, association colloids and viruses.

The ultrafiltration is carried out by supporting the UF-membrane on a porous support element and establishing a pressure drop across the membrane of 0.1–5 kgf/cm² gauge (0.01–0.5 MPa) while supplying the filtrate of the microfiltration, namely, the suspension passed through the MF-filter, to the concentration side of the membrane. By the method according to the present invention, the dispersing medium, e.g., water, which contains micronous components of finer impurities of micronous polishing refuse etc. is removed by permeation through a UF-membrane having a pore size of 2–50 nm, preferably 2–30 nm, or through a commercially available membrane assigned to a fractionated molecular weight of about 300,000, whereby a reclaimed abrasive suspension composed mainly of a colloidal silica with particle sizes in the range from several tens to 500 nm is obtained.

The so-obtained reclaimed abrasive suspension can be used as such in polishing processes by recirculation as the abrasive slurry or, alternatively, for preparing a new abrasive slurry using the recovered abrasive of colloidal silica and supplementing thereto other component(s).

By the method for recovering the abrasive particles according to the present invention, it is possible to remove substances responsible for the occurrence of surface damage on the polished semiconductor substrate and the materials causing reduction in the polishing ability as well, together with an unnecessary amount of the dispersing medium, in a simple manner, whereby abrasive particles available for polishing can be recovered at a permissible concentration for the polishing.

PREFERRED EMBODIMENT OF THE INVENTION

Below, the present invention is explained by way of embodiments with reference to the appended Drawings.

In FIG. 1, a flow diagram for the method of recovering the abrasive particles according to the present invention is shown, in which 1 denotes a microfilter and 2 denotes an ultrafilter, each partitioned by a microfiltration membrane 1a and an ultrafiltration membrane 2a, respectively, so as to form concentration chambers 1b and 2b and filtrate chambers 1c and 2c, respectively. For the filter element, every voluntary structure can be employed, for example, spiral type, hollow fiber type, tubular type and flat sheet type. 3 is a storage for the liquor to be treated and 4 is an intermediate storage.

For recovering the colloidal silica constituting the abrasive particles from a spent abrasive suspension, the spent suspension 5 is introduced into the storage 3 from which it is pressurized by a pump $P_1$ and supplied to the concentration chamber 1b of the microfilter 1 to subject it to a microfiltration through the microfiltration membrane 1a, whereby the colloidal silica particles which have particle sizes lower than 500 nm permeate together with the micronous impurities and the dispersing medium through the microfiltration membrane into the filtrate chamber 1c and the so-permeated filtrate is sent as an intermediate liquor 6 to the intermediate storage 4. The coarse impurity particles having sizes exceeding 500 nm are held back on the concentrate side of the membrane and are concentrated. This concentrate is held in circulation to the storage 3 via a valve 7. After the above operations have been completed and a concentration ratio of about 30- to 50-fold has been reached, the concentrate is discharged out as a waste liquor 13a to a waste canal 9 at a constant rate.

The intermediate liquor 6 deprived of the coarse impurities by the microfilter is supplied to the concentration chamber 2b of the ultrafilter 2 under a pressure by a pump $P_2$ and is subjected to an ultrafiltration therein through the ultrafiltration membrane 2a, whereby micronous impurity particles having particle sizes not higher than several tens of nm and the dispersing medium permeate through the membrane into the filtrate chamber 2c and the so-permeated filtrate is discharged out as a waste liquor 13b to a waste canal 10. The colloidal silica particles having particle sizes in the range from several tens to 500 nm are held back on the concentrate side of the membrane. The concentrate is held in circulation to the intermediate storage 4 via a valve 11. After the above operations have been completed and a predetermined concentration (10–30% by weight) has been reached, the concentrate is recovered as a recovered liquor 14 through a valve 12.

Figure 2:
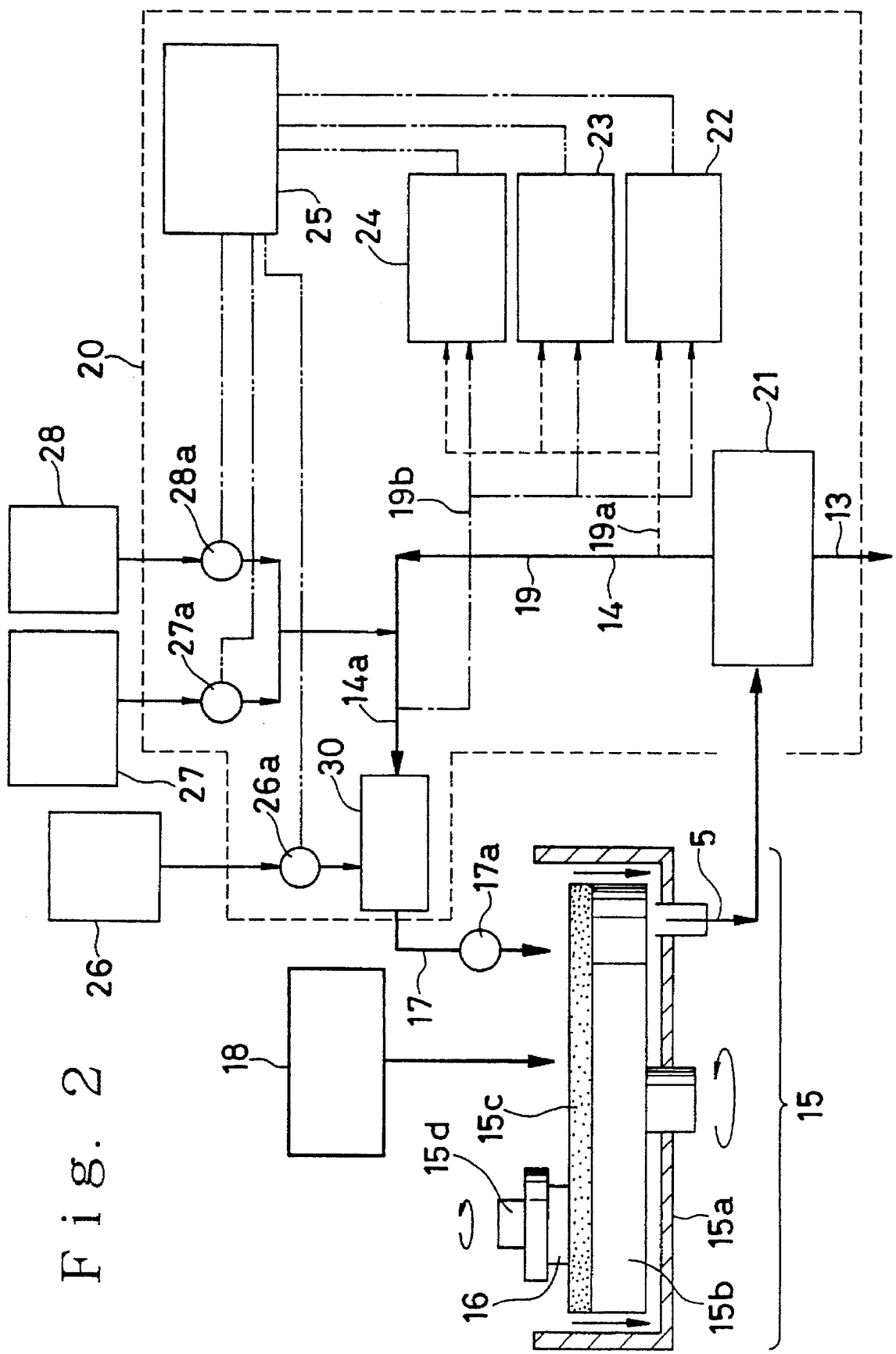
FIG. 2 illustrates an embodiment of the present invention in which the recovery method as shown in FIG. 1 is applied to a planarizing polishing of an interlayer insulator film, in a schematic flow diagram.

In FIG. 2, a flow diagram for the method of recovering the abrasive particles according to the present invention in an embodiment applied to a planarization polishing of an interlayer insulator film on a semiconductor substrate is shown, in which the abrasive slurry recovered by the recovery method shown in FIG. 1 is reused as a renewed abrasive suspension with the addition of an electrolyte salt solution for the planarization polishing.

In FIG. 2, 15 is a polishing section, 20 is a recovery/preparation section in which 21 denotes a recovery/concetration part indicated as a whole in FIG. 1, 25 denotes a control unit and 30 denotes a mixing part for the process liquor.

In the polishing section 15, a polishing pad 15c is fixed on a rotary table 15b rotating within a casing 15a, wherein a semiconductor substrate, e.g. silicon substrate 16 secured by a rotary chuck 15d, is fitted to the pad to effect the polishing.

In the polishing section 15, the polishing of the silicon substrate 16 is effected by pressing the silicon substrate 16 secured by the rotary chuck 15d onto the rotating polishing pad 15c while dropping an abrasive suspension 17 and a pad washing liquid (water) 18 onto the rotating polishing pad 15c to planarize the surface irregularities on the interlayer insulator film (not shown) formed on the surface of the silicon substrate 16. The polishing of the silicon oxide film (interlayer insulator film) proceeds by a chemical etching action by the silicon oxide and the mechanical action of friction between the film surface and the abrasive particles.

Spent polishing liquor 5 is discharged out of the polishing section 15. The spent polishing liquor 5 contains polishing refuse from the interlayer insulator film, silica particles and an ammonium salt. The spent polishing liquor 5 is passed to the recovery/concentration part 21 in the recovery/preparation section 20, in which, as explained above with respect to FIG. 1, it is subjected to the recovery of the recovered liquor 14 and the removal of the waste liquor 13 containing the polishing refuse and water.

For reusing the recovered liquor 14 from the recovery/concentration part 21, a sample of the recovered liquor 14 is taken out via a primary sampling line 19a during the transference of the recovered liquor 14 from the recovery/concentration part 21 to the mixing part 30 and is examined for its silica concentration, pH and ammonium salt concentration by a silica concentration detector 22 based on light transmittance, a pH detector 23 and a conductivity detector 24, respectively. Each of the detected values is supplied to the control unit 25.

To the recovered liquor 14, a 20% aqueous solution of an ammonim salt (pH=6) 27 and pure water 28 are each added in a recovery line 19 in such an amount that the silica concentration, the pH value and the ammonium salt concentration will correspond to those of the original silica abrasive suspension 26 (silica concentration=10% by weight, pH=6–7 and ammonium salt concentration=10% by weight) under a controlled flow rate by the corresponding flow rate regulators 27a and 28a by the command of the control unit 25.

The recovered liquor 14 is reused as a renewed polishing liquor 14a after adding thereto the ammonium salt solution 27 and pure water 28, each in a requisite amount, in which a function for minutely adjusting the rate of addition of the ammonium salt solution 27 and pure water 28 is incorporated, wherein a part of the recovered liquor, now including the added amounts of the ammonium salt solution and pure water, is taken out of a secondary sampling line 19b and is monitored for its silica concentration, pH and electric conductivity (concentration of electrolyte, such as the ammonium salt) by a silica concentration detector 22, a pH detector 23 and a conductivity detector 24, respectively, in order to actuate the control unit 25 so as to reach their respective set values.

Since the composition of the renewed polishing liquor 14a corresponds to that of the original silica abrasive suspension 26, it is possible to prepare an abrasive suspension 17 in the mixing part 30 by mixing the renewed polishing liquor 14a passed to the mixing part 30 with the original silica abrasive suspension 26 in every voluntary proportion by adjusting the rate of flow of the original silica abrasive suspension 26 to the mixing part 30 through a flow rate regulator 26a by command signals from the control unit 25. The so-prepared abrasive suspension 17 is dropped onto the polishing pad 15c on the rotary table 15b. It is possible, for example, to prepare an abrasive suspension 17 by mixing the renewed polishing liquor 14a and the original silica abrasive suspension 26 in a proportion of 1:1 or to use an abrasive suspension 17 composed of exclusively the renewed polishing liquor 14a. The rate of flow of the abrasive suspension 17 is adjusted by a flow rate regulator 17a.

As the ammonium salt to be employed in the above embodiment, there may be enumerated, for example, ammonium chloride, ammonium nitrate, ammonium acetate, ammonium sulfate and organic amines, such as piperazine and so on. The ammonium salt is used for the purpose of promoting the coagulation of the silica particles by increasing the electrical conductivity of the silica abrasive suspension and any weakly acidic, neutral and weakly alkaline compounds can be used therefor in principle. Examples of the weakly acidic compounds include acetic acid, dilute nitric acid and dilute sulfuric acid. Examples of the neutral compounds include sodium chloride, potassium chloride and hydrogen peroxide. While the above embodiment gives an example of use of only the colloidal silica for the abrasive particles, other fine particles of metal oxides, such as cerium oxide, aluminum oxide, manganese dioxide, triiron tetraoxide and the like may be used therefor.

Below, the present invention is described by way of Examples, in which % values are given on weight basis.

EXAMPLE 1

In the apparatus shown in FIG. 1, the microfilter 1 incorporates a flat sheet type module having polycarbonate microfiltration membranes of a pore size of 600 nm and the ultrafilter 2 incorporates a flat sheet type module having polysulfone ultrafiltration membranes assigned to a fractionated molecular weight of 300,000. Using this apparatus, an abrasive suspension containing spent colloidal silica (of a size distribution of 88% of 140–300 nm particles, 2% of 1,080 nm particles, 7% of 2,100 nm particles and 3% of 3,000 nm particles with 2.5% of colloidal silica concentration) was treated. The particle size distribution of the resulting recovered liquor was determined to be 100% of 140–300 nm particles with a colloidal silica concentration of 20%.

From the above result, it is seen that colloidal silica available for polishing can be recovered efficiently by subjecting the spent polishing liquor to a microfiltration and an ultrafiltration so as to remove the coarse impurities attributive to the occurrence of surface damage of the polished product and the micronous impurities attributive to the reduction of the polishing ability.

EXAMPLE 2

Using the apparatus shown in FIG. 2, an experiment of recovery and reuse of abrasive suspension was carried out. As the abrasive suspension 17, an original silica abrasive suspension 26 in which silica particles (abrasive particles) with an average particle size of 40 nm were dispersed at a concentration of 10% in a 10% aqueous solution of pH 6.5 of an ammonium salt was employed. The polishing was effected while dropping the abrasive suspension 17 at a rate of 100 ml/min for 5 minutes. Thus, the abrasive suspension 17 was used in an amount of 500 ml per substrate, on which an IC layer was fabricated. After the polishing of each substrate, the polishing pad 15c was washed with a washing liquid 18 (pure water) at a rate of 2,000 ml/min for one minute. Therefore, the time required for 1 cycle of the treatment per substrate amounted to 6 minutes consisting of 5 minutes for the polishing of the substrate and one minute for the washing of the polishing pad, in which the total amount of the spent polishing liquid was 2,500 ml per substrate. In the spent polishing liquor 5, 0.05 g of the polishing refuse from the interlayer insulator film, 50 g of silica particles and 50 g of the ammonium salt per treated substrate were contained. Thus, the silica particle concentration and the ammonium salt concentration in the spent polishing liquor 5 were found to have been diluted to about 2%, respectively.

This spent polishing liquor 5 was treated in the apparatus as given in FIG. 1, in which the polishing refuse and the silica aggregation particles of particle sizes exceeding 500 nm were removed together with the excess amount of water from the spent polishing liquor as the waste liquor 13. On the other hand, the silica concentration in the recovered liquor 14 from the recovery/concentration part 21 was found to have been concentrated to 20%. Here, however, the ammonium salt concentration was not changed and was 2% and had a pH of 7. By dropping 900 ml of the ammonium salt solution 27 (pH=6) and 100 ml of pure water 28 per 1,000 ml of the recovered liquor, the resulting renewed polishing liquor 14a had a silica concentration of 10%, an amonium salt concentration of 10% and a pH of 6.5.

What is claimed is:

1. A method for recovering abrasive particles within a desire size range from a spent abrasive suspension obtained from polishing a semiconductor substrate or a surface layer formed on said substrate, said suspension additionally contain coarse impurity particles which are coarser than said desired size range and fine impurity particles which are finer than said desired size range, said method comprising the steps of:

subjecting the spent abrasive suspension to microfiltration using a microfiltration membrane which permits the permeation of a filtrate containing the abrasive particles and the fine impurity particles therethrough and retains the coarse impurity particles on the retentate side thereof;

subjecting the filtrate from the microfiltration to ultrafiltration using an ultrafiltration membrane which allows water and the fine impurity particles to permeate therethrough and retains the abrasive particles on concentrate side thereof;

recovering the abrasive particles from the concentrate side of said ultrafiltration membrane; and recycling said recovered abrasive particles for polishing said semiconductor substrate.

2. A method according to claim 1, wherein the abrasive particles recovered from the ultrafiltration are reused with addition of an electrolyte salt thereto.

3. A method according to claim 1, wherein the particle size range of the abrasive particles is from 2 nm to 500 nm.

4. A method according to claim 1, wherein the abrasive particles are colloidal silica.

5. The method of claim 1, wherein said coarse particles have a particle size exceeding 500 nm.

6. A method for recovering abrasive particles within a desire size range from a spent abrasive suspension obtained from polishing a semiconductor substrate or a surface layer formed on said substrate, said suspension additionally contain coarse impurity particles which are coarser than said desired size range and fine impurity particles which are finer than said desired size range, said method consisting essentially of the steps of:

subjecting the spent abrasive suspension to microfiltration using a microfiltration membrane which permits the permeation of a filtrate containing the abrasive particles and the fine impurity particles therethrough and retains the coarse impurity particles on the retentate side thereof;

subjecting the filtrate from the microfiltration to ultrafiltration using an ultrafiltration membrane which allows water and the fine impurity particles to permeate therethrough and retains the abrasive particles on concentrate side thereof;

recovering the abrasive particles from the concentrate side of said ultrafiltration membrane; and recycling said recovered abrasive particles for polishing said semiconductor substrate.

* * * * *